US012734619B2

(12) United States Patent
Huang et al.

(10) Patent No.: US 12,734,619 B2
(45) Date of Patent: Sep. 15, 2026

(54) WELDING CLAMP

(71) Applicant: CONTEMPORARY AMPEREX TECHNOLOGY (HONG KONG) LIMITED, Hong Kong (CN)

(72) Inventors: Chaoqun Huang, Ningde (CN); Guangcheng Zhong, Ningde (CN); Lei Song, Ningde (CN); Zhonglin Lai, Ningde (CN); Hongtao Li, Ningde (CN); Shengdong Chen, Ningde (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 327 days.

(21) Appl. No.: 18/354,222

(22) Filed: Jul. 18, 2023

(65) Prior Publication Data

US 2024/0131635 A1 Apr. 25, 2024
US 2024/0227091 A9 Jul. 11, 2024

Related U.S. Application Data

(63) Continuation of application No. PCT/CN2023/081726, filed on Mar. 15, 2023.

(30) Foreign Application Priority Data

Oct. 24, 2022 (CN) ......................... 202222800034.1

(51) Int. Cl.
*B23Q 3/00* (2006.01)
*B23K 37/04* (2006.01)
(Continued)

(52) U.S. Cl.
CPC ....... *B23K 37/0435* (2013.01); *H01M 50/169* (2021.01); *B23K 2101/36* (2018.08)

(58) Field of Classification Search
CPC ............ B23Q 3/00; B23Q 3/06; B23Q 3/084; B23K 2101/36; B23K 37/0435; H01M 50/169
See application file for complete search history.

(56) References Cited

U.S. PATENT DOCUMENTS 5,971,379 A * 10/1999 Leon, Jr. ................. B25B 5/142
269/45
6,967,101 B1 * 11/2005 Larsson ............... C12N 5/0068
435/402
(Continued)

FOREIGN PATENT DOCUMENTS

CA 2009836 A1 * 1/1991 ............. B01D 71/52
CN 205111705 U 3/2016
(Continued)

OTHER PUBLICATIONS

Notice of Granting Utility Model Patent Right corresponding to copending CN application 202222800034.1 mailed Oct. 31, 2022.
(Continued)

*Primary Examiner* — Lee D Wilson
(74) *Attorney, Agent, or Firm* — Ladas & Parry, LLP

(57) ABSTRACT

A welding clamp for use in battery manufacturing is described. The welding clamp includes a plurality of clamping portions used to fit and clamp a case of a battery cell, the clamping portion includes a body portion and a connecting portion, and the connecting portion is detachably connected to the body portion; and a wear-resistant layer is connected to a surface of the connecting portion facing the case. In the process of welding the case and the end cover of the battery cell, through fitting and clamping the case by the clamping portion of the welding clamp, the clamping portion can play a position-limit role to the wall of the case to relieve the deformation of the case during the welding process, thereby (Continued)

improving the welding quality of the case and the end cover and thus improving the production quality of the battery cell.

7 Claims, 5 Drawing Sheets

(51) Int. Cl.
*H01M 50/169* (2021.01)
*B23K 101/36* (2006.01)

(56) References Cited

U.S. PATENT DOCUMENTS 8,066,270 B2 * 11/2011 Siegel .................. B25B 1/2452 269/282
11,614,111 B2 * 3/2023 Kovacs .................. B25B 5/003 361/825
2002/0008345 A1 * 1/2002 Van Der Toorn ..... H01L 21/687 269/309
2005/0045693 A1 3/2005 Buchheit et al.
2006/0082041 A1 * 4/2006 Huffman ............... B25B 1/2463 408/1 R

FOREIGN PATENT DOCUMENTS

CN 209127625 U 7/2019
CN 214079970 U 8/2021
CN 215280380 U 12/2021
CN 218385464 U 1/2023
JP 2012161876 A 8/2012
JP 2020171930 A 10/2020

OTHER PUBLICATIONS

Extended European Search Report corresponding to copending application 23736220.7 mailed Nov. 19, 2024.
ISR for International Application PCT/CN2023/081726 mailed May 29, 2023.
Written Opinion for International Application PCT/CN2023/081726 mailed May 29, 2023.

* cited by examiner

WELDING CLAMP

CROSS-REFERENCE TO RELATED APPLICATIONS

The present application is a continuation of International application PCT/CN2023/081726 filed on Mar. 15, 2023 which claims the priority of Chinese Patent Application No. 202222800034.1 filed on Oct. 24, 2022. These applications are incorporated herein by reference in its entirety.

TECHNICAL FIELD

The present application relates to the technical field of battery manufacturing, and in particular, to a welding clamp.

BACKGROUND ART

In the field of production of batteries used in vehicles, end cover welding is one of the important processes, which is used to weld the end cover and the case of the battery cell. The welding quality between the end cover and the case has an important influence on the quality of the battery cell. Therefore, how to improve the quality of the battery cell has become an urgent problem to be solved in the field of battery technology.

SUMMARY OF THE INVENTION

An embodiment of the present application provides a welding clamp to improve the quality of battery cells.

An embodiment of the present application provides a welding clamp including a plurality of clamping portions, the plurality of clamping portions are used to fit and clamp a case of a battery cell, the clamping portion includes a body portion and a connecting portion, and the connecting portion is detachably connected to the body portion; wherein a wear-resistant layer is connected to a surface of the connecting portion facing the case, and the wear-resistant layer is configured to be in contact with the case.

In the above technical solution, in the process of welding the case and the end cover of the battery cell, through fitting and clamping the case by the clamping portion of the welding clamp, the clamping portion can limit the wall of the case to relieve the deformation of the case during the welding process, thereby improving the welding quality of the case and the end cover and thus improving the production quality of the battery cell. The connecting portion of the clamping portion is provided with a wear-resistant layer configured to be in contact with the case, and through the contact of the wear-resistant layer with the case, the wear of the clamping portion caused by the direct contact between the clamping portion and the case is avoided, thereby prolonging the service life of the clamp and reducing the cost of maintaining and replacing the welding clamp. The provision of the wear-resistant layer can also alleviate the problem that the welding clamp scratches the case, which reduces the structural strength of the case and affects the appearance of the case, thereby further improving the quality of the battery cell. In addition, the body portion and the connecting portion are detachably connected, and when a part of the body portion and the connecting portion in the clamping portion is damaged, only the damaged part is replaced, and the undamaged part does not need to be replaced, which can save costs.

In some embodiments of the present application, the thickness of the wear-resistant layer is h, which satisfies 0.1 mm≤h≤1 mm.

In the above technical solution, if the thickness h of the wear-resistant layer is too small, the wear-resistant layer will be quickly damaged due to wear, its service life is short, and frequent replacement is required, which increases the welding cost and reduces the welding efficiency. If the thickness h of the wear-resistant layer is too large, the large thickness of the wear-resistant layer not only causes material waste, increases costs, but also increases the size of the welding clamp. Therefore, 0.1 mm≤h≤1 mm can not only make the wear-resistant layer have a longer service life, reduce the frequency of replacement, improve the welding efficiency and reduce welding costs, but also ensure that the provision of the wear-resistant layer does not lead to a too large size of the welding clamp.

In some embodiments of the present application, 0.2 mm≤h≤0.5 mm is satisfied.

In the above technical solution, if the thickness h of the wear-resistant layer satisfies 0.1 mm≤h<0.2 mm, although the service life of the wear-resistant layer is longer than that of the wear-resistant layer with thickness h<0.1 mm, it is not enough to meet the actual production needs on wear resistance. If the thickness h of the wear-resistant layer satisfies 0.5 mm<h≤1, although the thicker wear-resistant layer can improve the service life, for actual production, the wear-resistant layer of this thickness still makes the size of the welding clamp exceed the needs and conditions of actual production. Therefore, 0.2 mm≤h≤0.5 mm is a better choice for actual production, which can not only make the wear-resistant layer have a longer service life, reduce the frequency of replacement, improve the welding efficiency and reduce welding costs, but also ensure that the provision of the wear-resistant layer does not lead to a too large size of the welding clamp, so as to meet the replacement cycle requirements for the wear-resistant layer and the size requirements for the welding clamp in actual production.

In some embodiments of the present application, the material of the wear-resistant layer is one of Teflon, polybenzimidazole, polyamide-imide, polyimide and poly(ether-ether-ketone).

Among the above technical solutions, Teflon, polybenzimidazole, polyamide-imide, polyimide and poly(ether-ether-ketone) all have good wear resistance and high-temperature resistance, and any one of them as the material of the wear-resistant layer can make the wear-resistant layer have a longer service life, reduce the replacement frequency of the wear-resistant layer, reduce the welding cost and improve the welding efficiency.

In some embodiments of the present application, the welding clamp further includes a bonding layer, and the wear-resistant layer is bonded to the clamping portion through the bonding layer.

In the above technical solution, the wear-resistant layer is bonded to the clamping portion through the bonding layer, so that the connection between the wear-resistant layer and the clamping portion is simple, efficient, and has better connection stability.

In some embodiments of the present application, the melting point of the bonding layer is A, satisfying A≥180° C.

In the above technical solution, if the melting point of the bonding layer is low, the high temperature during the welding process will easily melt the bonding layer, which not only makes the wear-resistant layer fall off from the clamping portion easily during the welding process, but also makes the molten bonding layer adhere to the surface of the clamping portion and pollute the clamping portion when the wear-resistant layer is removed from the clamping portion. Therefore, if A≥180° C. is satisfied, during the welding process, the bonding layer is not easy to melt due to the welding temperature, which is conducive to maintaining a stable connection between the wear-resistant layer and the clamping portion, and after the wear-resistant layer is removed from the clamping portion, the molten bonding layer is not easy to adhere to the clamping portion, thereby keeping the clamping portion clean.

In an embodiment of the present application, A≥200° C. is satisfied.

In the above technical solution, in the case of 180° C.≤A<200° C., although the bonding layer can withstand a relatively high temperature, the welding method with a welding temperature in this range may lead to poor welding quality, resulting in insufficient welding strength of the case and the end cover of the battery cell. Therefore, A≥200° C. is a better choice for actual production, and during the welding process, the bonding layer can withstand higher temperatures, so that the welding method with higher welding temperatures generated during the welding process can be used, which is conductive to improving the welding quality of the case and the end cover and enhancing the welding efficiency.

In some embodiments of the present application, the body portion has a first surface facing the case, and at least a part of the wear-resistant layer protrudes from the first surface.

In the above technical solution, at least a part of the wear-resistant layer protrudes from the first surface, and the surface of the wear-resistant layer facing the case is closer to the case than the first surface, so that the wear-resistant layer is in contact with the case, and the body portion is not in contact with the case, which can reduce the risk of contact and wear between the body portion and the case.

In some embodiments of the present application, the wear-resistant layer completely covers the surface of the connecting portion facing the case.

In the above technical solution, the wear-resistant layer completely covers the surface of the connecting portion facing the case, which not only makes the wear-resistant layer have a larger surface in contact with the case, so as to better limit the deformation of the case during the welding process, but also can avoid wear due to direct contact between the connecting portion and the case in the process of clamping the case by the clamping portion.

In some embodiments of the present application, the body portion is provided with an accommodating portion for accommodating at least a part of the connecting portion.

In the above technical solution, the provision of the accommodating portion is conductive to improving the connection stability between the connecting portion and the body portion.

In some embodiments of the present application, the welding clamp includes four clamping portions, two of the clamping portions fit and clamp the case along a first direction, the other two clamping portions fit and clamp the case along a second direction, and the first direction is perpendicular to the second direction.

In the above technical solution, the four clamping portions can fit and clamp the case in pairs in directions perpendicular to each other, so as to better limit the deformation of the case during the welding process.

DESCRIPTION OF DRAWINGS

To more clearly describe the technical solutions of the embodiments of the present application, the drawings to be used in the embodiments will be briefly introduced below, and it should be understood that the following drawings only show some embodiments of the present application, and therefore should not be considered as limiting the scope of the present application. For those of ordinary skills in the art, other relevant drawings may also be obtained based on these drawings without creative efforts.

Figure 1:
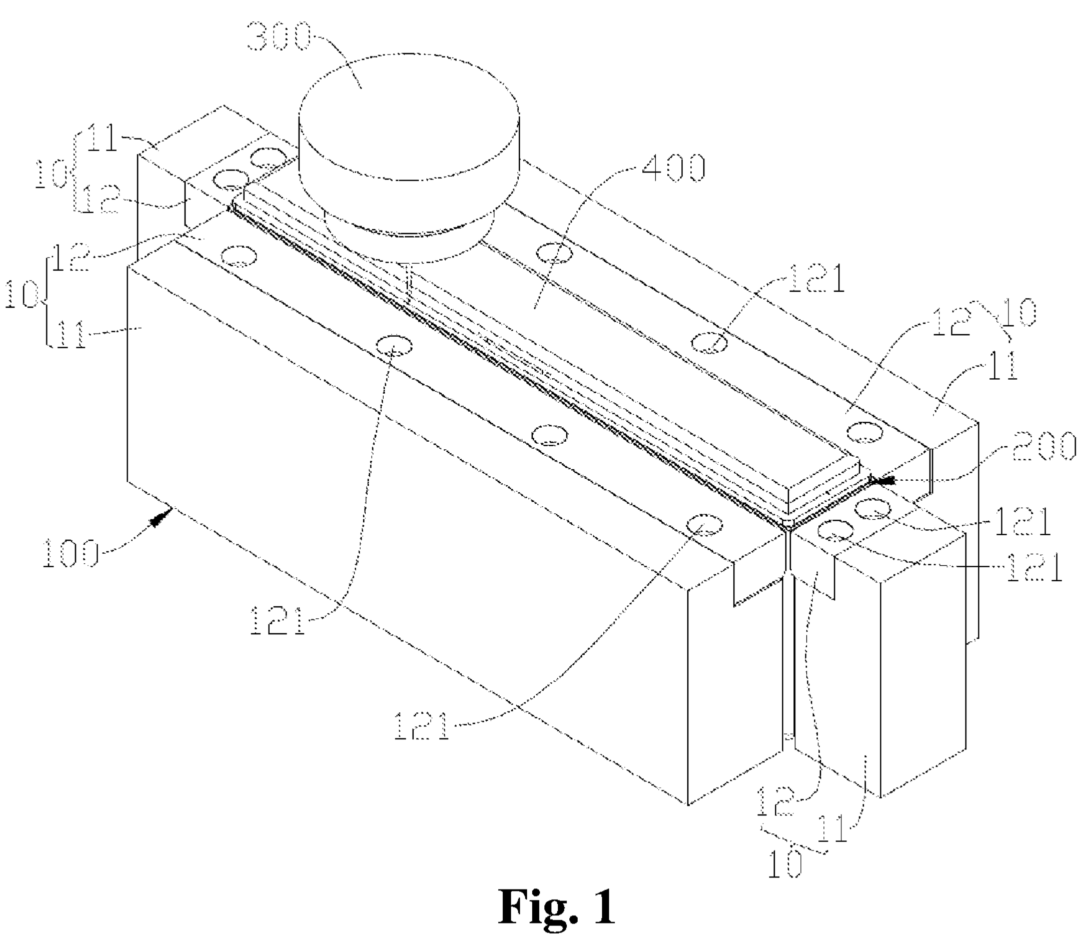
FIG. 1 is a schematic diagram showing fitting between a welding clamp and a case of a battery cell according to some embodiments of the present application.

Reference numerals: 100—welding clamp; 10—clamping portion; 11—body portion; 111—first surface; 112—accommodating portion; 113—third surface; 114—fourth surface; 115—fifth surface; 12—connecting portion; 121—mounting hole; 122—second surface; 20—wear-resistant layer; 30—bonding layer; 200—battery cell; 210—case; 2101—opening; 220—end cover; 300—welding gun; 400—protective member.

DETAILED DESCRIPTION

To make the objectives, technical solutions and advantages of the embodiments of the present application clearer, the technical solutions in the embodiments of the present application will be clearly and completely described below in conjunction with the drawings in the embodiments of the present application, and it is apparent that the described embodiments are a part of the embodiments of the present application rather than all the embodiments. The assembly of the embodiments of the present application generally described and illustrated in the drawings herein can be arranged and designed in a variety of different configurations.

Accordingly, the following detailed description of the embodiments of the present application provided in the drawings is not intended to limit the protection scope claimed by the present application, but merely represents selected embodiments of the present application. Based on the embodiments in the present application, all other embodiments obtained by those of ordinary skill in the art without creative effort fall within the protection scope of the present application.

It should be noted that the features of the embodiments in the present application may be combined with each other without conflict.

It should be noted that like numerals and letters denote similar items in the following drawings, therefore, once an item is defined in one drawing, it does not require further definition and explanation in subsequent drawings.

In the description of the embodiments of the present application, it should be noted that the indicated orientation or position relationship is based on the orientation or position relationship shown in the drawings, or the orientation or position relationship that the product of the present application is usually placed in use, or the orientation or position relationship that is commonly understood by those skilled in the art, only for the convenience of describing the present application and simplifying the description, rather than indicating or implying that the indicated device or element must have a specific orientation, be constructed and operated in a specific orientation, so it cannot be understood as a limitation on the present application. In addition, the terms "first", "second" and "third" are used for distinguishing descriptions, and cannot be construed as indicating or implying relative importance.

At present, from the perspective of the development of the market situation, power batteries are more and more widely used. The power batteries are used in energy storage power source systems such as hydraulic, thermal, wind and solar power stations as well as in electric vehicles such as electric bicycles, electric motorcycles and electric cars, and military equipment and aerospace fields. With the continuous expansion of the application field of the power batteries, the market demand is also constantly expanding.

The battery mentioned in the embodiments of the present application refers to a single physical module comprising one or more battery cells to provide a higher voltage and capacity. For example, the battery mentioned in the present application may include a battery module, a battery pack, or the like. The battery generally comprises a box body for encapsulating one or more battery cells. The box body can prevent liquids or other foreign matters from affecting the charging or discharging of the battery cells.

In the present application, the battery cell may comprise a lithium-ion secondary battery, a lithium-ion primary battery, a lithium-sulfur battery, a sodium-lithium-ion battery, a sodium-ion battery, a magnesium-ion battery, or the like, without limitation in the embodiments of the present application. The battery cell may be cylindrical, flat, rectangular, or in other shapes, which is also not limited in the embodiments of the present application. The battery cells are generally divided into three types according to encapsulating manners: cylindrical battery cells, cuboid battery cells, and pouch cells, which are not limited in the embodiments of the present application.

A battery cell includes an electrode assembly, a case, an end cover and an electrode assembly.

The electrode assembly consists of a positive electrode sheet, a negative electrode sheet and a separator. The battery cell works mainly relying on the movement of metal ions between the positive electrode sheet and the negative electrode sheet. The positive electrode sheet comprises a positive electrode current collector and a positive electrode active material layer, wherein the positive electrode active material layer is coated on a surface of the positive electrode current collector, the part of the positive electrode current collector not coated with the positive electrode active material layer protrudes from the part of the positive electrode current collector already coated with the positive electrode active material layer, and the part of the positive electrode current collector not coated with the positive electrode active material layer serves as a positive tab. Taking a lithium-ion battery as an example, the material of the positive electrode current collector may be aluminum, and the positive electrode active material may be lithium cobalt oxide, lithium iron phosphate, ternary lithium, lithium manganate, or the like. The negative electrode sheet comprises a negative electrode current collector and a negative electrode active material layer, wherein the negative electrode active material layer is coated on a surface of the negative electrode current collector, the part of the negative electrode current collector not coated with the negative electrode active material layer protrudes from the part of the negative electrode current collector already coated with the negative electrode active material layer, and the part of the negative electrode current collector not coated with the negative electrode active material layer serves as a negative tab. The material of the negative electrode current collector may be copper, and the negative electrode active material may be carbon, silicon, or the like. In order to ensure that no fusing occurs when a large current passes, there are a plurality of positive tabs which are stacked together, and there are a plurality of negative tabs which are stacked together. The separator may be made of polypropylene (PP), polyethylene (PE), or the like. In addition, the electrode assembly may be of a wound structure or a laminated structure, which is not limited in the embodiments of the present application.

The case has an opening, and the end cover is used to close the opening of the case, so that the case and the end cover jointly form an accommodating space for accommodating the electrode assembly.

Generally, the case and the end cover are welded so that the end cover covers the opening of the case. During the welding process, due to high welding temperature or other reasons, the case may be deformed towards the outside of the case. In order to alleviate the deformation of the case during the welding process, the case can be fitted and clamped by a plurality of clamping portions of a welding clamp, and the clamping portions can limit the deformation of the case.

However, the inventors found that, during the production process, the clamping portion frequently squeezes and rubs against the outer surface of the case, and as a result, the clamping portion is easily damaged due to wear, which increases the production cost. Moreover, the clamping portion is in direct contact with the case, which may easily cause scratches on the case, affect the appearance of the battery cell and the structural strength of the case, and further affect the quality of the battery cell.

Based on the above considerations, in order to alleviate the problem of the wear of the clamping portion and the scratches on the case caused by the clamping portion in the production process, the inventors have designed a welding clamp after in-depth research. The welding clamp includes a plurality of clamping portions that fit and clamp the case, and the clamping portion is provided with a wear-resistant layer configured to be in contact with the case.

The clamping portion is provided with a wear-resistant layer configured to be in contact with the case, and through the contact of the wear-resistant layer with the case, the wear of the clamping portion caused by the direct contact between the clamping portion and the case is avoided, thereby prolonging the service life of the clamp and reducing the cost of maintaining and replacing the welding clamp. The provision of the wear-resistant layer can also alleviate the problem that the welding clamp scratches the case, which reduces the structural strength of the case and affects the appearance of the case, thereby improving the quality of the battery cell.

In addition, in the process of welding the case and the end cover of the battery cell, through fitting and clamping the case by the clamping portion of the welding clamp, the clamping portion can limit the wall of the case to relieve the deformation of the case during the welding process, thereby improving the welding quality of the case and the end cover and thus improving the production quality of the battery cell.

The welding clamp disclosed in the embodiments of the present application can be used for but not limited to the welding operation on the case and the end cover of the battery cell. It can also be used for welding of other products, such as welding operations on vehicles, mobile phones, tablets, laptops, electric toys, electric tools, battery cars, electric cars, ships, spacecraft, etc. It is conducive to alleviating structural deformation during the welding process, reducing the risk of welding clamping wear and reducing the risk of scratches on the welded structure, thereby improving the quality of welded products.

As shown in FIG. 1, an embodiment of the present application provides a welding clamp 100, the welding clamp 100 includes a plurality of clamping portions 10, and the plurality of clamping portions 10 are used to fit and clamp a case 210 of a battery cell 200; wherein, the clamping portion 10 is provided with a wear-resistant layer 20 (shown in FIG. 4), and the wear-resistant layer 20 is configured to be in contact with the case 210.

"A plurality of" refers to two or more. The plurality of clamping portions 10 fit and clamp the case 210 of the battery cell 200, and it may be that all the clamping portions 10 jointly clamp the case 210, or some clamping portions 10 in all the clamping portions 10 clamp the case 210.

Figure 2:
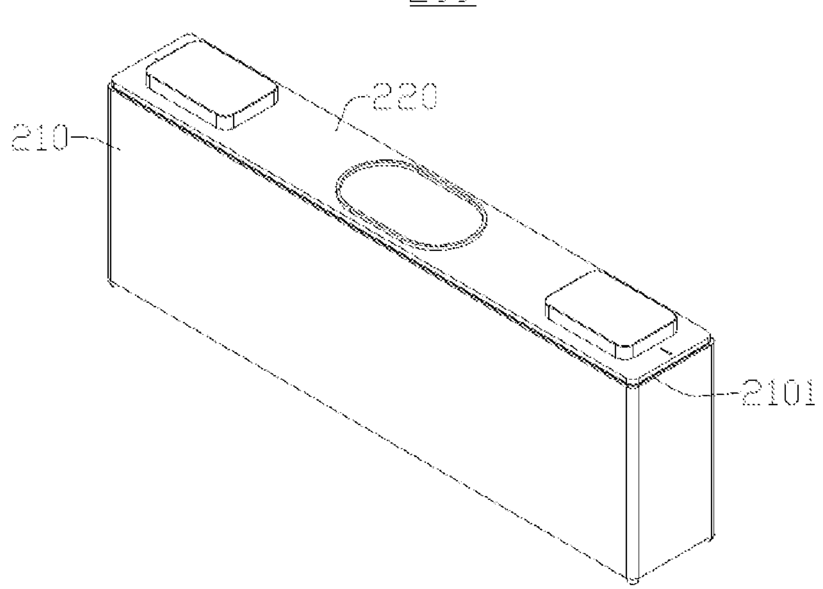
FIG. 2 is a schematic structural diagram of a battery cell according to some embodiments of the present application.
Figure 3:
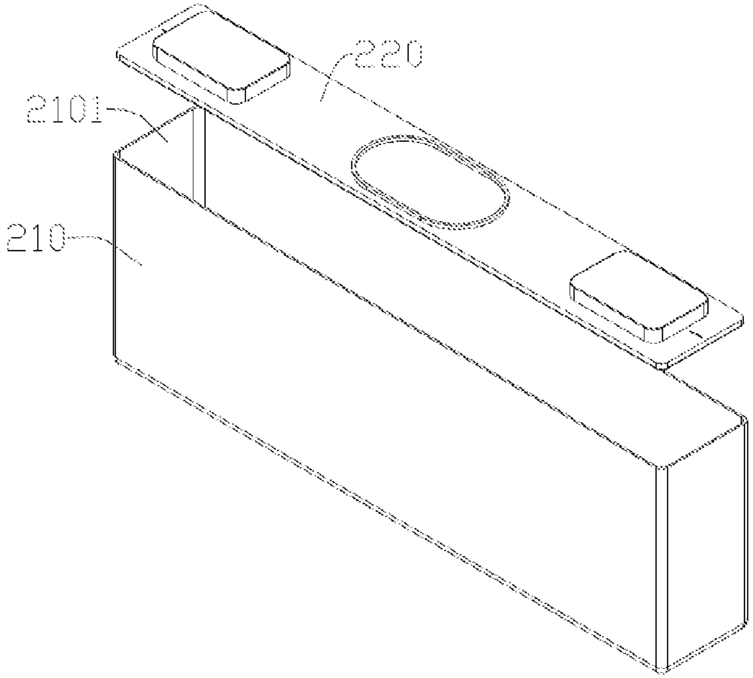
FIG. 3 is a schematic structural diagram of a case and an end cover of the battery cell in FIG. 2.

Exemplarily, as shown in FIGS. 1, 2 and 3, the case 210 of the battery cell 200 is a cuboid. In an embodiment where all the clamping portions 10 fit and clamp the case 210, the clamping portions 10 each abut against the various side walls of the case 210 so as to jointly clamp the case 210, and all the clamping portions 10 are arranged around an opening 2101 of the case 210. In an embodiment where some of the clamping portions 10 fit and clamp the case 210, these clamping portions 10 can respectively abut against two opposite side walls of the case 210, so as to clamp the case 210. The end cover 220 covers the opening 2101 of the case 210. In order to reduce damage to the end cover 220 by a welding gun 300 during the welding process, a protective member 400 is provided on a side of the end cover 220 away from the case 210 to protect the end cover 220. The protective cover is arranged on the side of the end cover 220 away from the case 210, which can also play a role in limiting the deformation of the end cover 220 during the welding process. The welding gun 300 includes but is not limited to a laser welding gun 300 and an electric welding gun 300.

The wear-resistant layer 20 is in direct contact with the case 210. The material of the wear-resistant layer 20 may be different from that of the clamping portion 10. The wear resistance of the wear-resistant layer 20 may be better than that of the clamping portion 10. A surface of the case 210 opposite to the clamping portion 10 may only be partly in contact with the corresponding wear-resistant layer 20. The closer the case 210 is to the opening 2101, the greater the influence of the welding temperature, and the easier it is to deform. The position where the surface of the case 210 is in contact with the wear-resistant layer 20 is relatively close to the opening 2101 of the case 210, so that the clamping portion 10 can clamp the case 210 in an area where the case 210 and the end cover 220 are welded, which can more effectively restrict the deformation of the case 210. Of course, the entire surface of the case 210 opposite to the clamping portion 10 may be in contact with the corresponding wear-resistant layer 20.

In the process of clamping the case 210 by the clamping portion 10, the wear-resistant layer 20 and the case 210 come into contact and wear frequently. The hardness of the wear-resistant layer 20 can be weaker than that of the material of the case 210, which can reduce the risk of the wear-resistant layer 20 scratching the case 210 and damaging the case 210.

In the process of welding the case 210 and the end cover 220 of the battery cell 200, through fitting and clamping the case 210 by the clamping portion 10 of the welding clamp 100, the clamping portion 10 can limit the wall of the case 210 to relieve the deformation of the case 210 during the welding process, thereby improving the welding quality of the case 210 and the end cover 220 and thus improving the production quality of the battery cell 200. The clamping portion 10 is provided with a wear-resistant layer 20 configured to be in contact with the case 210, and through the contact of the wear-resistant layer 20 with the case 210, the wear of the clamping portion 10 caused by the direct contact between the clamping portion 10 and the case 210 is avoided, thereby prolonging the service life of the clamp and reducing the cost of maintaining and replacing the welding clamp 100. The provision of the wear-resistant layer 20 can also alleviate the problem that the welding clamp 100 scratches the case 210 to reduce the structural strength of the case 210 and affect the appearance of the case 210, and can further improve the quality of the battery cell 200.

In addition, the body portion 11 and the connecting portion 12 are detachably connected, and when a part of the body portion 11 and the connecting portion 12 in the clamping portion 10 is damaged, only the damaged part is replaced, and the undamaged part does not need to be replaced, which can save costs.

Figure 4:
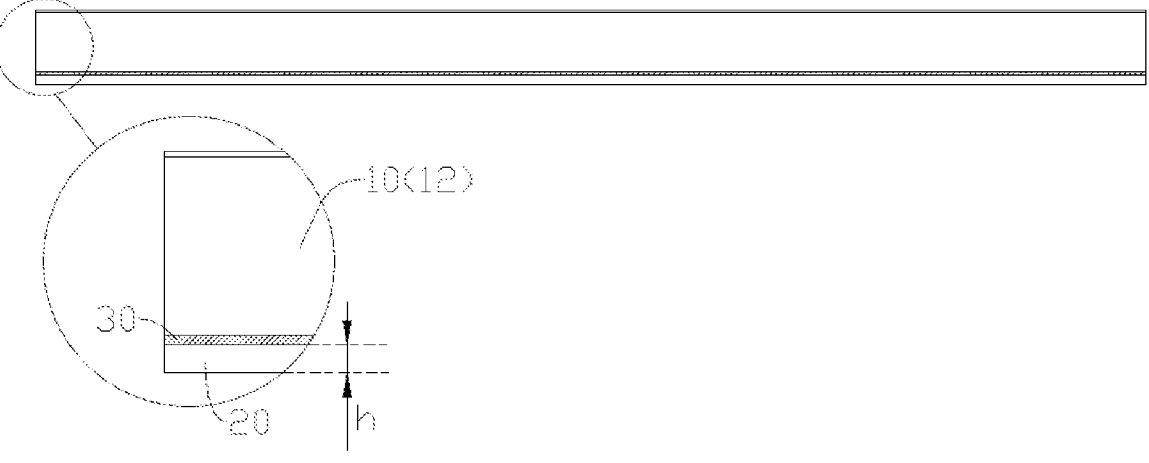
FIG. 4 is a schematic structural diagram where the clamping portion is connected to a wear-resistant layer according to some embodiments of the present application.

As shown in FIG. 4, in some embodiments, the thickness of the wear-resistant layer 20 is h, which satisfies 0.1 mm≤h≤1 mm.

The thickness of the wear-resistant layer 20 refers to the dimension of the wear-resistant layer 20 along the direction away from the corresponding clamping portion 10. For example, h can be 0.1 mm, 0.2 mm, 0.3 mm, 0.4 mm, 0.5 mm, 0.6 mm, 0.7 mm, 0.8 mm, 0.9 mm, and 1 mm.

If the thickness h of the wear-resistant layer 20 is too small, the wear-resistant layer 20 will be quickly damaged due to wear, its service life is short, and frequent replacement is required, which increases welding costs and reduces the welding efficiency. If the thickness h of the wear-resistant layer 20 is too large, the large thickness of the wear-resistant layer 20 not only causes material waste, increases costs, but also increases the size of the welding clamp 100. Therefore, 0.1 mm≤h≤1 mm can not only make the wear-resistant layer 20 have a longer service life, reduce the frequency of replacement, improve the welding efficiency and reduce welding costs, but also ensure that the provision of the wear-resistant layer 20 does not lead to a too large size of the welding clamp 100.

In some embodiments, 0.2 mm≤h≤0.5 mm is satisfied.

For example, h can be 0.2 mm, 0.25 mm, 0.27 mm, 0.33 mm, 0.35 mm, 0.37 mm, 0.43 mm, 0.45 mm, 0.47 mm, and 0.5 mm.

If the thickness h of the wear-resistant layer 20 satisfies 0.1 mm≤h<0.2 mm, although the service life of the wear-resistant layer 20 is longer than that of the wear-resistant layer 20 with thickness h<0.1 mm, it is not enough to meet the actual production needs on wear resistance. If the thickness h of the wear-resistant layer 20 satisfies 0.5 mm<h≤1, although the thicker wear-resistant layer 20 can improve the service life, for actual production, the wear-resistant layer 20 of this thickness still makes the size of the welding clamp 100 beyond the needs and conditions of actual production. Therefore, 0.2 mm≤h≤0.5 mm is a better choice for actual production, which can not only make the wear-resistant layer 20 have a longer service life, reduce the frequency of replacement, improve the welding efficiency and reduce welding costs, but also ensure that the provision of the wear-resistant layer 20 does not lead to a too large size of the welding clamp 100, so as to meet the replacement cycle requirements for the wear-resistant layer 20 and the size requirements for the welding clamp 100 in actual production.

The material of the wear-resistant layer 20 may be engineering plastics with excellent wear resistance. In some embodiments, the material of the wear-resistant layer 20 is Teflon (polytetrafluoroethylene, abbreviated as PTFE)), polybenzimidazole (abbreviated as PBI), polyamide-imide (PAI), polyimide (abbreviated as PI) and poly(ether-ether-ketone) (abbreviated as PEEK).

It can be understood that the material of the wear-resistant layer 20 is Teflon, polybenzimidazole, polyamide-imide, polyimide or poly(ether-ether-ketone). It can also be that the wear-resistant layer 20 includes a plurality of structural layers stacked together, and the material of each structural layer is different. The material of each structural layer can be Teflon, polybenzimidazole, polyamide-imide, polyimide or poly(ether-ether-ketone).

Teflon, polybenzimidazole, polyamide-imide, polyimide and poly(ether-ether-ketone) all have good wear resistance and high temperature resistance, and any one of them as the material of the wear-resistant layer 20 can make the wear-resistant layer 20 have a longer service life, reduce the replacement frequency of the wear-resistant layer 20, reduce the welding cost and improve the welding efficiency.

The wear-resistant layer 20 is arranged on the clamping portion 10 and can be arranged on the clamping portion 10 in a detachable manner, for example, the connection between the wear-resistant layer 20 and the clamping portion 10 can be realized by snap-fit connection, bolt connection, etc., so as to facilitate the replacement of the wear-resistant layer 20.

In some embodiments, the welding clamp 100 further includes a bonding layer 30, and the wear-resistant layer 20 is bonded to the clamping portion 10 through the bonding layer 30.

The bonding layer 30 may be a bonding tape or solidified glue coated between the wear-resistant layer 20 and the clamping portion 10. The bonding layer 30 may include a vinyl acetate-based polymer latex binder, a polyimide-type binder, or the like.

When the wear-resistant layer 20 needs to be replaced, the wear-resistant layer to be replaced can be torn off from the clamping portion 10. It can be understood that bonding the wear-resistant layer 20 to the clamping portion 10 through the bonding layer is a way to realize the detachable connection between the clamping portion 10 and the wear-resistant layer 20.

The wear-resistant layer 20 is bonded to the clamping portion 10 through the bonding layer 30, so that the connection between the wear-resistant layer 20 and the clamping portion 10 is simple, efficient, and has better connection stability.

In some embodiments, the melting point of the bonding layer 30 is A, satisfying A≥180° C.

In an embodiment that the bonding layer 30 is a bonding tape, the bonding tape includes a tape-shaped carrier and a bonding attached to both sides of the tape-shaped carrier, the melting point of the tape-shaped carrier and the melting point of the bonding attached to both sides of the tape-shaped carrier can both be greater than or equal to 180° C.

For example, A can be 180° C., 280° C., 380° C., 480° C., 580° C., 680° C., 780° C., 880° C., 980° C., 1080° C., and 1180° C. Exemplarily, the bonding layer 30 may include a silicone bonding with a melting point of 1670° C.

Since the wear-resistant layer 20 is in contact with the case 210, during the welding process, the temperature of the case 210 will rise due to the welding, which will cause the bonding layer 30 to be in a high temperature environment. If the melting point of the bonding layer 30 is low, the high temperature during the welding process will easily melt the bonding layer 30, which not only makes the wear-resistant layer 20 fall off from the clamping portion 10 easily during the welding process, but also makes the molten bonding layer 30 adhere to the surface of the clamping portion 10 and pollute the clamping portion 10 when the wear-resistant layer 20 is removed from the clamping portion 10. Therefore, if A≥180° C. is satisfied, during the welding process, the bonding layer 30 is not easy to melt due to the welding temperature, which is conducive to maintaining a stable connection between the wear-resistant layer 20 and the clamping portion 10, and after the wear-resistant layer 20 is removed from the clamping portion 10, the molten bonding layer is not easy to adhere to the clamping portion 10, thereby keeping the clamping portion clean.

Further, A≥200° C. is satisfied.

For example, A can be 200° C., 300° C., 400° C., 500° C., 600° C., 700° C., 800° C., 900° C., 1000° C., 1100° C., and 1200° C.

In the case of 180° C.≤A<200° C., although the bonding layer 30 can withstand a relatively high temperature, the welding method with a welding temperature in this range may lead to poor welding quality, resulting in insufficient welding strength of the case 210 and the end cover 220 of the battery cell 200. Therefore, A≥200° C. is a better choice for actual production, and during the welding process, the bonding layer 30 can withstand higher temperatures, so that the welding method with higher welding temperature generated during the welding process can be used, which is conductive to improving the welding quality of the case 210 and the end cover 220 and enhancing the welding efficiency.

Figures 5, 6:
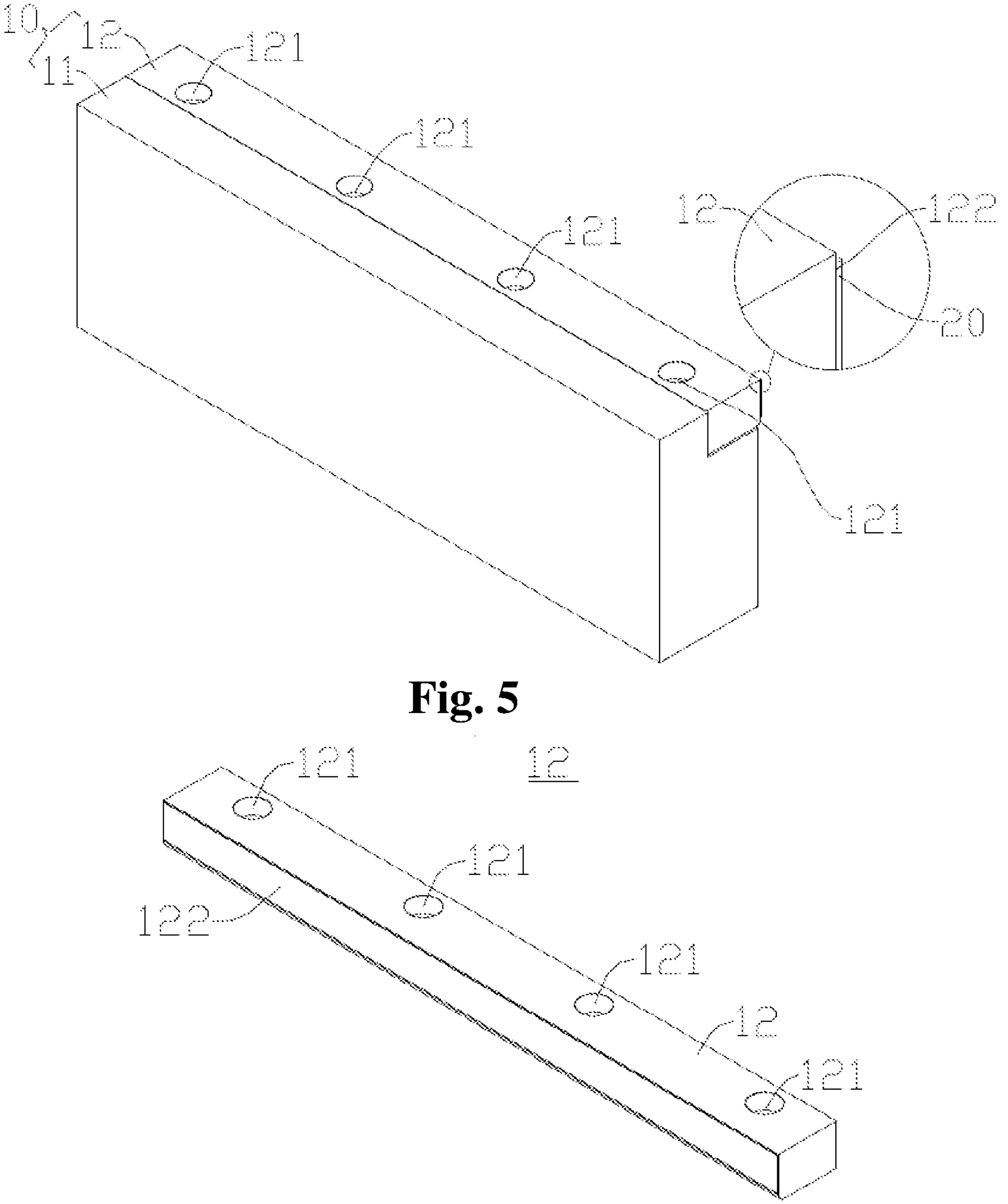
FIG. 5 is a schematic structural diagram of a clamping portion provided with a wear-resistant layer according to some embodiments of the present application.
FIG. 6 is a schematic structural diagram of a connecting portion according to some embodiments of the present application.

The structure of the clamping portion 10 can be in various structural forms, for example, the clamping portion 10 is a clamping block with an integrated structure. For another example, as shown in FIGS. 5 and 6, in some embodiments, the clamping portion includes a body portion 11 and a connecting portion 12, the connecting portion 12 is detachably connected to the body portion 11, and the wear-resistant layer 20 is connected to a surface of the connecting portion 12 facing the case 210.

Figures 7, 8:
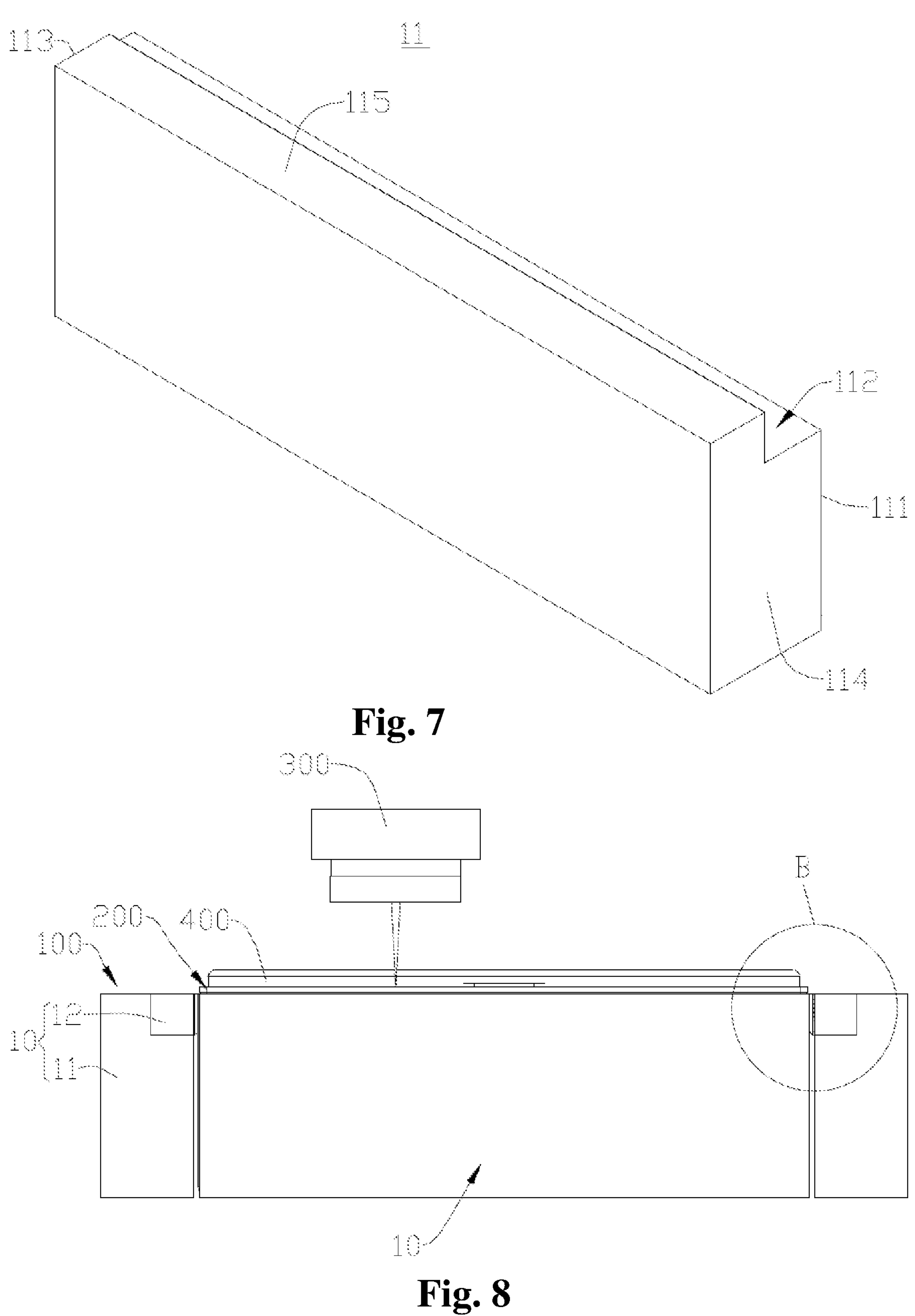
FIG. 7 is a schematic structural diagram of a body portion according to some embodiments of the present application.
FIG. 8 is a schematic structural diagram where a battery cell and a welding clamp are fitted according to some embodiments of the present application.

The connecting portion 12 and the body portion 11 can be detachably connected by means of bonding, bolt connection, snap-fit and the like. As shown in FIGS. 5, 6 and 7, a plurality of mounting holes 121 are provided on the connecting portion 12, and the connecting element (not shown) is penetrated in the mounting holes 121, so that the body portion 11 and the connecting portion 12 is detachably connected via the connecting element. The mounting hole 121 can be a threaded hole, and the connecting element can be a bolt or a screw.

The materials of the connecting element and the body portion 11 can be the same or different. The materials of the connecting element and the body portion 11 can be steel, iron, aluminum, red copper and the like.

In the embodiment, the wear-resistant layer 20 can be bonded to a surface of the connecting portion 12 facing the case 210 through the bonding layer 30. During the welding process, the wear-resistant layer 20 and the connecting portion 12 are closer to the opening 2101 of the case 210 relative to the body portion 11, so that the wear-resistant layer can be in contact with the case 210 at the opening 2101 of the case 210 and limit the deformation of an area of the case 210 near the opening 2101.

The body portion 11 and the connecting portion 12 are detachably connected, and when a part of the body portion 11 and the connecting portion 12 in the clamping portion 10 is damaged, only the damaged part is replaced, and the undamaged part does not need to be replaced, which can save costs.

Figure 9:
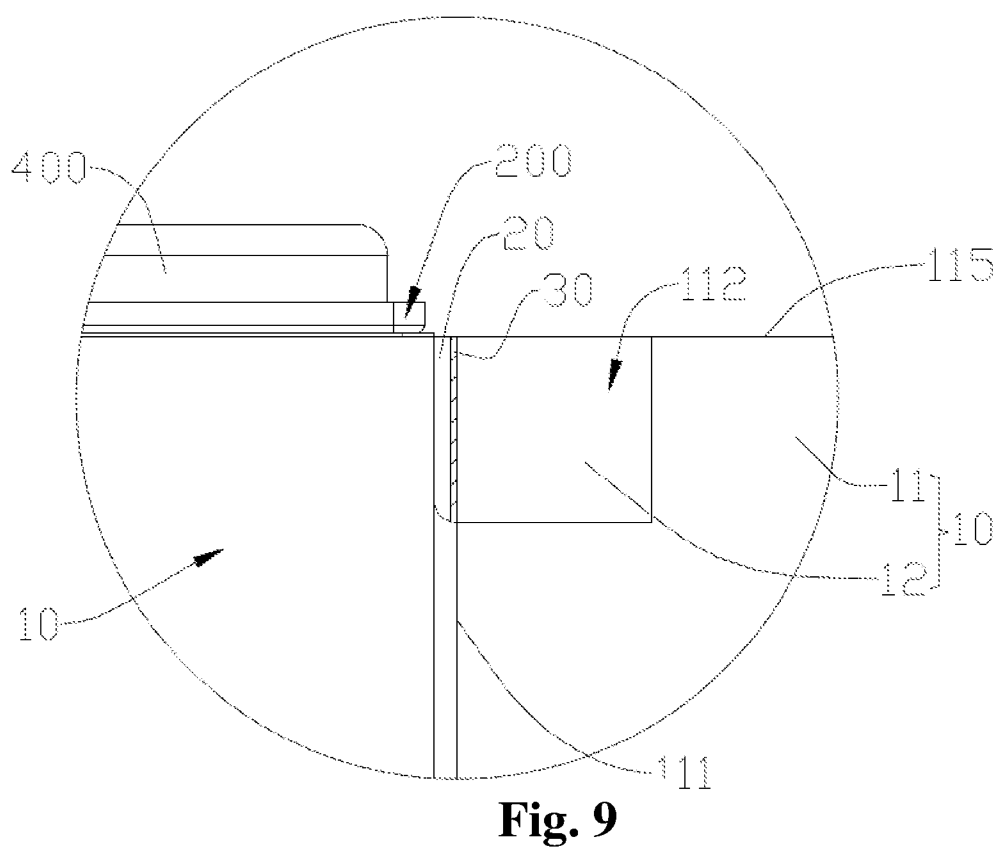
FIG. 9 is an enlarged view at B in FIG. 8.

As shown in FIGS. 8 and 9, in some embodiments, the body portion 11 has a first surface 111 facing the case 210, and the wear-resistant layer 20 at least partially protrudes from the first surface 111.

Since the wear-resistant layer 20 at least partially protrudes from the first surface 111, a surface of the wear-resistant layer 20 facing the case 210 is closer to the case 210 than the first surface 111, so that when the surface of the wear-resistant layer 20 facing the case 210 is in contact with the surface of the case 210, the surface of the case 210 facing the first surface 111 and the first surface 111 are arranged with a distance (not in contact), which can reduce the risk of wear of both the case 210 and the body portion 11 due to friction between the body portion 11 and the case 210.

Of course, in some other embodiments, the surface of the wear-resistant layer 20 facing the case 210 and the first surface 111 of the body portion 11 facing the case 210 may be flush (that is, coplanar). If the surface of the case 210 facing the wear-resistant layer 20 is large enough, when the surface of the wear-resistant layer 20 facing the case 210 is in contact with the surface of the case 210, the first surface 111 may also be in contact with the surface of the case 210.

In some embodiments, the wear-resistant layer 20 completely covers the surface of the connecting portion 12 facing the case 210.

The surface of the connecting portion 12 facing the case 210 is defined as a second surface 122, and the wear-resistant layer 20 covers the entire second surface 122. The edge of the wear-resistant layer 20 may be flush with the edge of the second surface 122. The wear-resistant layer 20 may also extend beyond the edge of the second surface 122.

The wear-resistant layer 20 completely covers the surface of the connecting portion 12 facing the case 210, which not only makes the wear-resistant layer 20 have a larger surface in contact with the case 210, so as to better limit the deformation of the case 210 during the welding process, but also can avoid wear due to direct contact between the connecting portion 12 and the case 210 in the process of clamping the case 210 by the clamping portion 10.

Certainly, in some other embodiments, the wear-resistant layer 20 may also only cover a part of the surface of the connecting portion 12 facing the case 210. The surface of the connecting portion 12 facing the case 210 extends beyond at least a part of the edge of the wear-resistant layer 20.

Please further refer to FIGS. 6-9. In some embodiments, the body portion 11 is provided with an accommodating portion 112, and the accommodating portion 112 is used for accommodating at least a part of the connecting portion 12.

As shown in FIG. 7, the accommodating portion 112 may be a groove provided on the first surface 111 of the body portion 11 facing the case 210.

The body portion 11 also has a third surface 113, a fourth surface 114 and a fifth surface 115, the third surface 113 and the fourth surface 114 are parallel, the third surface 113 and the fourth surface 114 are arranged oppositely, the third surface 113 and the fourth surface 114 are respectively connected to the two opposite ends of the fifth surface 115, the third surface 113 and the fourth surface 114 are further respectively connected to the two opposite ends of the first surface 111, and the third surface 113 and the fourth surface 114 are both perpendicular to the fifth surface 115. The fifth surface 115 is connected to the first surface 111. The first surface 111, the third surface 113 and the fifth surface 115 are perpendicular to each other. The groove runs through the third surface 113, the fourth surface 114 and the fifth surface 115. The connecting portion 12 can be partly accommodated in the groove, or completely accommodated in the groove. At least a part of the connecting portion 12 is accommodated in the groove, and the connecting portion 12 is intercalated into the body portion 11, which can reduce the overall size of the clamping portion 10.

In the embodiment where only a part of the connecting portion 12 is accommodated in the groove, the connecting portion 12 can only extend out of the groove along a direction perpendicular to the third plane, or only extend out of the groove along a direction perpendicular to the fifth plane, or only extend out of the groove along a direction perpendicular to the first plane.

In the embodiment where only a part of the connecting portion 12 is accommodated in the groove, the connecting portion 12 can only extend out of the groove both along a direction perpendicular to the third plane and along a direction perpendicular to the fifth plane; the connecting portion 12 can only extend out of the groove both along a direction perpendicular to the first plane and along a direction perpendicular to the fifth plane; the connecting portion 12 can only extend out the grooves both along a direction perpendicular to the first plane and along a direction perpendicular to the third plane.

In the embodiment where only a part of the connecting portion 12 is accommodated in the groove, the connecting portion 12 can extend out of the groove along a direction perpendicular to the third plane, along a direction perpendicular to the fifth plane, and along a direction perpendicular to the first plane at the same time.

Along the direction perpendicular to the first plane, the connecting portion 12 can extend out of the groove, or can be completely located in the groove.

In the embodiment where the connecting portion 12 is completely located in the groove in a direction perpendicular to the first plane, along the direction perpendicular to the first plane, a surface of the connecting portion 12 facing the case 210 can be flush with the first surface 111 (that is, coplanar). In this case, the wear-resistant layer 20 is completely outside the groove, and the wear-resistant layer 20 protrudes completely from the groove.

In the embodiment where the connecting portion 12 is completely located in the groove in a direction perpendicular to the first plane, along the direction perpendicular to the first plane, the surface of the connecting portion 12 facing the case 210 may be farther away from the case 210 than the first surface 111. In this case, in the direction perpendicular to the first plane, a part of the wear-resistant layer 20 may extend into the groove, and another part may extend out of the groove to protrude from the first surface 111.

In some other embodiments, the groove can also extend to a part of the third surface 113, the fourth surface 114 and the fifth surface 115. For example, the groove only extends to the third surface 113, or only extends to the fifth surface 115, or only extends to the third surface 113 and the fifth surface 115.

In some other embodiments, the groove may also not extend to any one of the third surface 113, the fourth surface 114 and the fifth surface 115.

Of course, in some other embodiments, the accommodating portion 112 may also be formed in other ways, for example, the accommodating portion 112 is a cavity that is detachably connected to the box body of the body portion 11 and that is open to at least one side of the case.

The provision of the accommodating portion 112 is conductive to improving the connection stability between the connecting portion 12 and the body portion 11.

In some embodiments, the welding clamp 100 includes four clamping portions 10, two clamping portions 10 fit and clamp the case 210 along a first direction, the other two clamping portions 10 fit and clamp the case 210 along a second direction, and the first direction is perpendicular to the second direction.

The two clamping portions 10 are arranged opposite to each other in the first direction, and are respectively used to abut against the two opposite side walls of the case 210 in the first direction. The other two clamping portions 10 are arranged opposite to each other in the second direction, and are respectively used to abut against the two opposite side walls of the case 210 in the second direction. The side wall abutting against the clamping portion 10 is a wall surrounding the opening 2101 of the case 210.

According to the different sizes of the side walls corresponding to the clamping portion 10, the size of the clamping portion 10 can be different. For example, the size of the two opposite side walls in the first direction is smaller than the size of the two opposite side walls in the second direction, then the size of the clamping portions 10 that fit and clamp the case 210 along the first direction is smaller than that of the clamping portions 10 that fit and clamp the case 210 along the second direction, so that the size of the clamping portion 10 matches that of the corresponding side wall.

The four clamping portions 10 can fit and clamp the case 210 in pairs in directions perpendicular to each other, so as to better limit the deformation of the case 210 during the welding process.

In some embodiments, the welding clamp 100 further includes a plurality of driving members, the driving members are arranged in one-to-one correspondence with the clamping portions 10, and the driving members are used to drive the movement of the clamping portions 10, so that the clamping portions 10 can fit and clamp the case 210 or release the case 210.

An embodiment of the present application provides a welding clamp 100. The welding clamp 100 includes four clamping portions 10, two clamping portions 10 are arranged opposite to each other in a first direction, the other two clamping portions 10 are arranged opposite to each other in a second direction, and the direction is perpendicular to the second direction. Each clamping portion 10 includes a body portion 11 and a connecting portion 12, the first surface 111 of the body portion 11 facing the case 210 is provided with a groove, and the groove runs through the third surface 113, the fourth surface 114 and the fifth surface 115 connected to the first surface 111. The body portion 11 is detachably connected into the groove. A wear-resistant layer 20 is bonded to a surface of the connecting portion 12 facing the case 210 through a bonding layer 30. Along the direction perpendicular to the first surface 111, at least a part of the wear-resistant layer 20 extends out of the groove, so that the wear-resistant layer 20 protrudes from the first surface 111. The melting point A of the bonding layer 30 is ≥180° C. The material of the wear-resistant layer 20 is one of Teflon, polybenzimidazole, polyamide-imide, polyimide and poly(ether-ether-ketone).

The above are only preferred embodiments of the present application, and are not intended to limit the present application. For those skilled in the art, the present application can have various modifications and changes. Any modifications, equivalent replacements, improvements, etc. made within the spirit and principle of the present application shall be included within the scope of protection of the present application.

The invention claimed is:

1. A welding clamp, comprising:

a plurality of clamping portions; the plurality of clamping portions including:

a first clamping portion having a first clamping surface;

a second clamping portion having a second clamping surface parallel to and facing the first clamping surface;

a third clamping portion having a third clamping surface perpendicular to the first clamping surface;

a fourth clamping portion having a fourth clamping surface parallel to and facing the third clamping surface;

wherein the first, second, third and fourth clamping surfaces are adapted to form together a perimeter of a four-sided clamping recess, the clamping recess being provided for fitting and clamping a four-sided case of a battery cell;

each clamping portion including:

a body portion with a groove, and a wear piece detachably connected to the body portion in the groove, such that a rectangular clamping surface of the wear piece forms at least a part of the clamping surface of the clamping portion;

wherein, a contact layer of one of Teflon, polybenzimidazole, polyamide-imide, polyimide and poly (ether-ether-ketone) is bonded with a bonding layer to the rectangular clamping surface of the wear piece of each clamping portion, such that each of the four sides of a four-sided case of a battery that is fitted and clamped in the four-sided clamping recess is in contact with the contact layer of the wear piece of one of the clamping portions.

2. The welding clamp according to claim 1, wherein the contact layer has a thickness h satisfying 0.1 mm≤h≤1 mm.

3. The welding clamp according to claim 2, wherein 0.2 mm≤h≤0.5 mm is satisfied.

4. The welding clamp according to claim 1, wherein the melting point of the bonding layer is A, satisfying A≥180° C.

5. The welding clamp according to claim 4, wherein A≥200° C. is satisfied.

6. The welding clamp according to claim 1, wherein the contact layer of the wear piece of each of the first, second, third and fourth clamping portions at least partially protrudes from respectively the first, second, third and fourth clamping surfaces.

7. The welding clamp according to claim 1, wherein the rectangular clamping surface of each wear piece is completely covered by the contact layer.

* * * * *